INVENTOR.
JESSE FRED GURLEY, JR.

United States Patent Office 3,420,506
Patented Jan. 7, 1969

3,420,506
MIXING APPARATUS
Jesse Fred Gurley, Jr., Pittsburgh, Pa., assignor to Mobay Chemical Company, Pittsburgh, Pa., a corporation of Delaware
Continuation of application Ser. No. 401,819, Oct. 6, 1964. This application Apr. 3, 1967, Ser. No. 628,159
U.S. Cl. 259—7   5 Claims
Int. Cl. B01f 7/24

ABSTRACT OF THE DISCLOSURE

A mixing apparatus comprises a frusto-conically shaped chamber with an agitator of substantially the same shape disposed therewithin, said chamber having inlet means and a discharge opening and being only slightly larger thàn the agitator, whereby substantially instantaneous mixing may be accomplished with resultant increase in pump-out capability due to the relatively small capacity for the material to be mixed, said agitator having a shaft and a stirrer, said shaft extending longitudinally through the center of said stirrer, said stirrer having a receiving portion adjacent said inlet means, a body mixing portion, and securing means adjacent said discharge opening, said receiving portion being substantially bowl-shaped and having an axially aligned bore therethrough adapted to receive said shaft, said bowl-shaped receiving portion having a side wall and a base, said side wall having a plurality of slot-like openings therein whereby liquid components of said mixing apparatus may be channeled to said body mixing portion, said stirrer being comprised of a plurality of discs with spacers therebetween, said discs adapted to be moveable and said discs and spacers having a bore through the center thereof to receive said shaft, each of said discs having a diameter greater than that of the spacers adjacent thereto and having a plurality of tooth-like projections, said securing means being attached to said shaft and having a plurality of obliquely extending grooves therein adapted to communicate with said discharge opening of said chamber.

---

This application is a continuation of application Ser. No. 401,819, filed Oct. 6, 1964, now abandoned.

This invention relates generally to an apparatus for mixing liquids together and, more particularly, to an apparatus which is especially well suited for mixing together the components of a polyurethane plastic.

Polyurethane plastics are prepared by reacting an organic compound having at least two reactive hydrogen atoms, such as, for example, a polyester, a polyalkylene ether, a polyalkylene thioether, a polyester amide, or the like, with a polyisocyanate and then reacting the resulting product with a chain extender or cross-linking agent. Suitable catalysts or accelerators and other additives may also be included in the reaction liquid to vary the rate of reaction and other characteristics of the reaction mixture and the product. In some processes, the organic compound having the reactive hydrogen atoms is first reacted with an excess of a polyisocyanate and the resulting product having terminal NCO groups is then reacted with the chain extender or cross-linking in a separate operation. Both the prepolymer having free NCO groups and the organic compound having at least two reactive hydrogen atoms are substantially more viscous than the polyisocyanate, the catalyst, the chain extender and the activator mixture and are used in a much larger quantity than the latter materials. It is, therefore, very difficult to uniformly disperse the relatively small volume of the less viscous material into the larger volume of the more viscous material.

One of the most successful apparatuses heretofore available for mixing the various components of a polyurethane plastic together is described in the Hoppe et al. Reissue Patent 24,514. The apparatus described in that patent has a mixing chamber provided with injection nozzles through which the polyisocyanate and other components are injected into the more viscous organic compound having reactive hydrogen atoms. Although the apparatus disclosed in the Hoppe et al. patent effects complete mixing of the components of a polyurethane plastic substantially instantaneously, some difficulty has been encountered when the operation of the apparatus is on an intermittent basis, since chemical reaction occurs between the compounds remaining in the mixing chamber with the result that on solidification of the reactants, the apparatus becomes plugged up. As a consequence, it is necessary to immediately drain the liquids remaining in the mixing chamber each time the apparatus is stopped and to completely clean the apparatus before it can be used again.

Some progress has been made in the art with the introduction of agitators specially designed to obviate the necessity for the ritual of draining, cleaning and reassembling the mixing apparatus. Examples of such suitable agitators are given in U.S. Patents 2,969,960 and 2,970,817. However, there are several objectionable aspects to the agitators devised to circumvent the problem of the clogging up of the apparatus during intermittent use. The construction of that portion of the agitator which contains the vanes which are the means by which complete mixing is achieved must generally be fabricated from a single member made of steel, for example, on which the mixing vanes must be essentially hand-hewn; for this reason, the agitators described in those patents are exorbitantly expensive. Further, there is no versatility in the agitators described in those apparatuses. That is, once the agitator has been made, there is no way to change the spacing between the vanes, or the angle of pitch of the vanes or the angle at which the vanes are situated on the agitator. Consequently, the mixing speed of the agitator is set and unchangeable, and the characteristics of the product are not variable without the use of other mechanical expediencies which must be employed in conjunction with the mixer, even though the improved agitators of the above mentioned patents are being used.

It is, therefore, an object of this invention to provide a device for mixing the components of a polyurethane plastic together, which device is substantially self-cleaning and adapted for intermittent operation.

It is a further object of this invention to provide a device for mixing the components of a polyurethane plastic, which device is, relatively speaking, much less expensive than those heretofore available.

A further object of this invention is to provide an apparatus for mixing the components of a polyurethane plastic, which device is versatile and capable of being easily modified.

Still another object of this invention is to provide an apparatus for mixing the components of a polyurethane plastic together, which device will allow the operator to modify the properties of the polyurethane plastic product without the use of additional mechanical expediencies.

These and other objects will become apparent from the following description with reference to the accompanying drawing in which.

Figure 1:
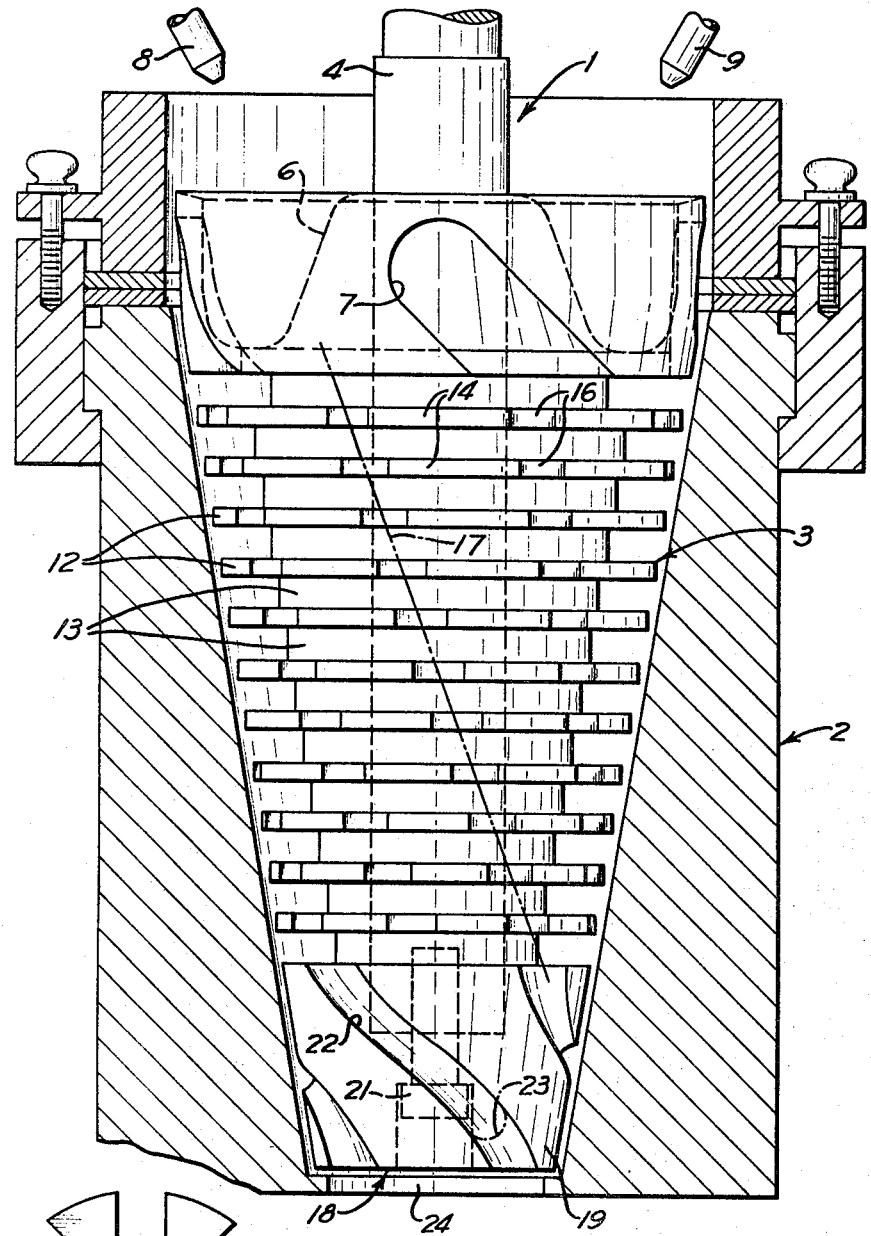
FIGURE 1 is a longitudinal view, partially in section, of one embodiment of the invention.

The foregoing objects and others are accomplished in accordance with this invention, generally speaking, by providing an agitating means for mixing liquids together, which is comprised of a shaft that extends longitudinally through the center of a stirrer which is preferably in the shape of a frustum and comprised of essentially three parts; the first part is a receiving means for the liquids to be mixed, and is substantially bowl-shaped. The bowl-shaped portion has an axially aligned bore adapted to receive the shaft and a plurality of slot-like openings in the side wall thereof. Preferably, the bowl-shaped portion of the stirrer has a raised center portion, so that a vertical cross-section of the first part of the stirrer is substantially in the shape of a W, and the slot-like openings in the outer wall thereof extend through the bottom of the bowl-shaped receiving means, connecting it with the second portion of the stirrer. The second part of the stirrer is comprised of a plurality of moveable and interchangeable discs, each of which has a plurality of tooth-like projections, and is preferably separated from the next adjacent disc by a spacer, which is also moveable and interchangeable. The third part of the stirrer is a means for securing the first two portions of the stirrer to the shaft, and is preferably comprised of a base through which a securing means is passed, or which is itself engaged to the shaft. Preferably the base portion also has a plurality of obliquely extending grooves in it by which the mixed liquids are pumped out.

The invention further contemplates an agitator of the above described type in combination with a mixing chamber with which it is substantially concentric. The mixing chamber is provided with inlet means which direct the liquid constituents of the polyurethane plastic into the W-shaped section or receiving portion of the stirrer from which the liquid constituents are channeled by means of slots therein to the second portion of the stirrer. Best results have been obtained when the inlet means includes at least one injection nozzle. The injection nozzles may be located around the circumference of the mixing chamber at one longitudinal level, or they may be spaced apart longitudinally so that each of the inlets are situated at an angle in the chamber wall and directs the liquid which it is introducing to the stirring mechanism diagonally across the mixing chamber to that part of the receiving means diagonally opposite it. The inlet injectors may also be spaced around the circumference of the mixing chamber in two or more planes so that there might be two or more rows of injectors. Such an arrangement is particularly desirable where each injection jet is of a limited capacity necessitating the use of a plurality of nozzles to introduce the constituents.

The agitator is driven by any suitable motor connected to the shaft of the agitator, and it is situated in a mixing chamber, the dimensions of which should be such that the mixing chamber is only slightly larger than the agitator. In that case, the capacity of the mixing chamber for the liquid constituents of a polyurethane plastic is relatively small allowing for substantially instantaneous mixing with a low inventory of liquid at any given time in the mixing chamber while the pump-out capability of the apparatus is greatly facilitated. However, in a preferred embodiment of this invention, the mixing chamber is of such construction that its relative position with respect to the stirrer can be changed to provide various sized spaces between the walls of the chamber and the agitator, and therefore a mixing apparatus is provided which can be adjusted to different volumes. It is also preferable that the discharge portion of the chamber be adapted to shield the effluence from the agitator somewhat so that it does not spray randomly in an umbrella fashion on discharge, but is instead channeled out in a relatively uniform stream. The discharge orifice may also communicate with a suitable conduit which, in turn, may communicate with a suitable shaping means; it is to be understood, however, that discharge may be had directly from the nozzle without any depending conduit or channeling means if it is so desired.

Because the discs of the agitator are moveable and interchangeable, and because the graduations in the diameter size of the discs may be large or small, it is possible to regulate the length and shape of the stirrer as well as the number of discs therein. Further, in addition to the fact that the spacers between the discs are also moveable and interchangeable and of graduated diameter size, they may be of any desired thickness so that the discs may be separated by either a larger or smaller space as suits the equipment at hand and the reactants involved. It is but a matter of expediency, in instances where sufficiently wide discs or spacers are not available, to use as many discs and spacers together as is required to achieve the proper thicknesses of the discs and spacers. One distinct advantage of components which may be so easily interchanged is that if an apparatus requires that a stirrer or similar type of equipment be used which cannot have a frusto-conical shape, the discs and spacers of this agitator may be arranged so that a cylindrical shape is given to them or they may be graduated to resemble two frustums with abutting apexes or bases. It is therefore quite clear that the agitator of this invention may be adapted for many uses in many different types of apparatus with a minimum of effort and equipment at hand. As a consequence, if one has discs and spacers available, he can make up an agitator to fit any chamber, even one having a distinctly unorthodox shape. As an illustration of this, in one embodiment of this invention, the agitator herein described can be used in combination with a pin-type agitator in a cylindrical or partially cylindrical mixing chamber. In that case, the shaft of the agitator described herein has a plurality of pins extending radially therefrom in combination with the herein described device. For this assembly, the whole mixer including the pin-type agitator and the agitator of this invention may be in a substantially cylindrical shape, or else, the portion of the mixing chamber adapted to accommodate the agitator of this invention may be in a substantially frusto-conical shape. In any event, it is readily apparent that there are diverse modifications possible when one employs the agitator of this invention.

In a preferred embodiment of the agitator of this invention, the tooth-like projections of the discs, instead of being flat as shown in the diagram, are turned up or down at an angle which complements the angle of pitch of the agitator. In this instance, it is a relatively simple operation to bend the teeth either before or after assembling the stirrer portion of the agitator.

Since the angle of pitch of the agitator may be so easily regulated because of the mobility of the discs and spacers, it is a simple matter to regulate some of the characteristics of the product by altering the pitch of the tooth-like projections and thus causing rapid mixing with either fast exit of the mixed reactants, or slower exit of the reactants. In the latter instance, a back pressure on the reactants is built up, and thus, by a simple adjustment, one is able to regulate the pore size of a foam, for example, should the product being fabricated be a cellular polyurethane. This adjustment of the back pressure by altering the arrangement of the discs and, therefore, the pitch of the stirrer is an expedient means of slowing down or speeding up the residence time of the liquids within the chamber.

It is readily apparent that the above described agitator is adaptable to changing conditions of machinery and reactants, and that subtle changes in the product may be achieved without the inconvenience and expense of additional mechanical expediencies. Further, the stirrer itself is relatively inexpensive, costing approximately half the amount to fabricate as do those disclosed in U.S. Patents 2,969,960 and 2,970,817, for example. In addition, the apparatus is easy to clean; after the components to be mixed have stopped flowing into the chamber, the agitator is simply revolved in order to force any remaining liquid out of the mixing chamber and the cleaning operation is complete. As a matter of fact, since it is fairly clear that because the whole stirring portion of the mixer as herein described is capable of easy and rapid disassembly, any more thorough cleaning of the agitator which may even be required in the course of operations would be much more easily accomplished than would be possible with any of the conventional agitators. By simply removing a single screw or bolt, the whole agitator may be disassembled for easy cleaning with the most conventional of cleaning materials.

In preparing polyurethane plastics in the apparatus provided by this invention, any mixture of components which will react together to form a solidified polyurethane may be used. Suitable processes and formulations for making cellular polyurethanes are disclosed in the Hoppe et al. Patent 2,764,565, while suitable formulations and processes for making substantially non-porous rubber-like polyurethanes are disclosed in this patent as well as in U.S. Patents 2,620,516 and 2,729,618. Any of these processes and formulations and others may be used in preparing polyurethanes in the apparatus provided by this invention.

In the process of preparing the polyurethane by any known method which will yield a solid polyurethane product, the liquids having the lower viscosity, such as the polyisocyanate and the catalysts, should preferably be injected into the more viscous liquid under a pressure substantially higher than the back pressure in the mixing chamber. Any inlet pressure greater than the pressure in the chamber may be used, but ordinarily the best results are obtained when this pressure is in the order of about 300 pounds per square inch or more, although, in some instances, pressures of as low as 100 pounds per square inch may be used. The agitator of the improved design provided by this invention makes it possible to operate at lower injection pressures than would be permissible with an agitator of earlier design. Further, in operating the apparatus in the preparation of a polyurethane plastic, the various liquid components such as, for example, liquid components which react to form a polyurethane plastic, are introduced into the mixing chamber while the stirrer is constantly turning at a relatively high speed of from about 1,500 to about 10,000 revolutions per minute. The components are substantially instantaneously mixed and the resulting mixture flows from the apparatus and later forms a polyurethane plastic by chemical reaction between the components.

Referring now to the drawings for a detailed description of one embodiment of the invention, the agitator 1 is enclosed in a mixing chamber 2. The agitator 1 has a stirrer, designated broadly as 3, mounted on a shaft 4. The stirrer has essentially three parts; the first part is a substantially bowl-shaped receiving portion 6, having an axially aligned bore therethrough which is adapted to receive the shaft 4 of the agitator. The bowl-shaped portion of the stirrer 6 has a vertical cross-section substantially in the shape of a W, with a plurality of slot-like openings 7 in the outer walls of it. The slot-like openings 7 are preferably equally spaced in the wall of the bowl-shaped portion 6 of the stirrer and are preferably situated at 45° angles with reference to the base of the bowl-shaped portion 6. It is also preferable that there be about four of these slot-like openings in the first portion of the stirrer although more or less than four may be employed, as desired. The liquid components to be mixed are introduced to the bowl-shaped portion of the agitator through the mixing chamber via inlets 8 and 9, and channeled to the second portion of the stirrer through the slot-like apertures 7. The second portion of the stirrer is comprised of a plurality of moveable and interchangeable discs, such as 12, and spacers, such as 13. Preferably, eleven discs and ten spacers are used in the fabrication of the stirrer of this invention, the discs having a thickness of about .06" and the spacers having a thickness of about .12". It is to be understood, however, that any number of discs and spacers may be employed, and that they may have any desired thickness, not necessarily uniform, according to the equipment at hand and the characteristics of the liquids to be mixed. Thus, the discs may be separated by greater or lesser thicknesses of spacers and the discs themselves may be of greater or lesser or graduated thicknesses as desired. Conversely, should it be so desired, it is obvious that the discs alone may be used without the alternating spacers therebetween.

Figure 2:
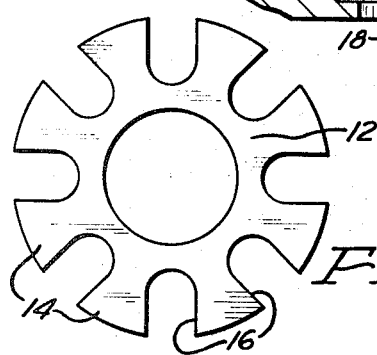
FIGURE 2 is a plan view of one of the discs shown in the assembly of FIGURE 1.
Figure 3:
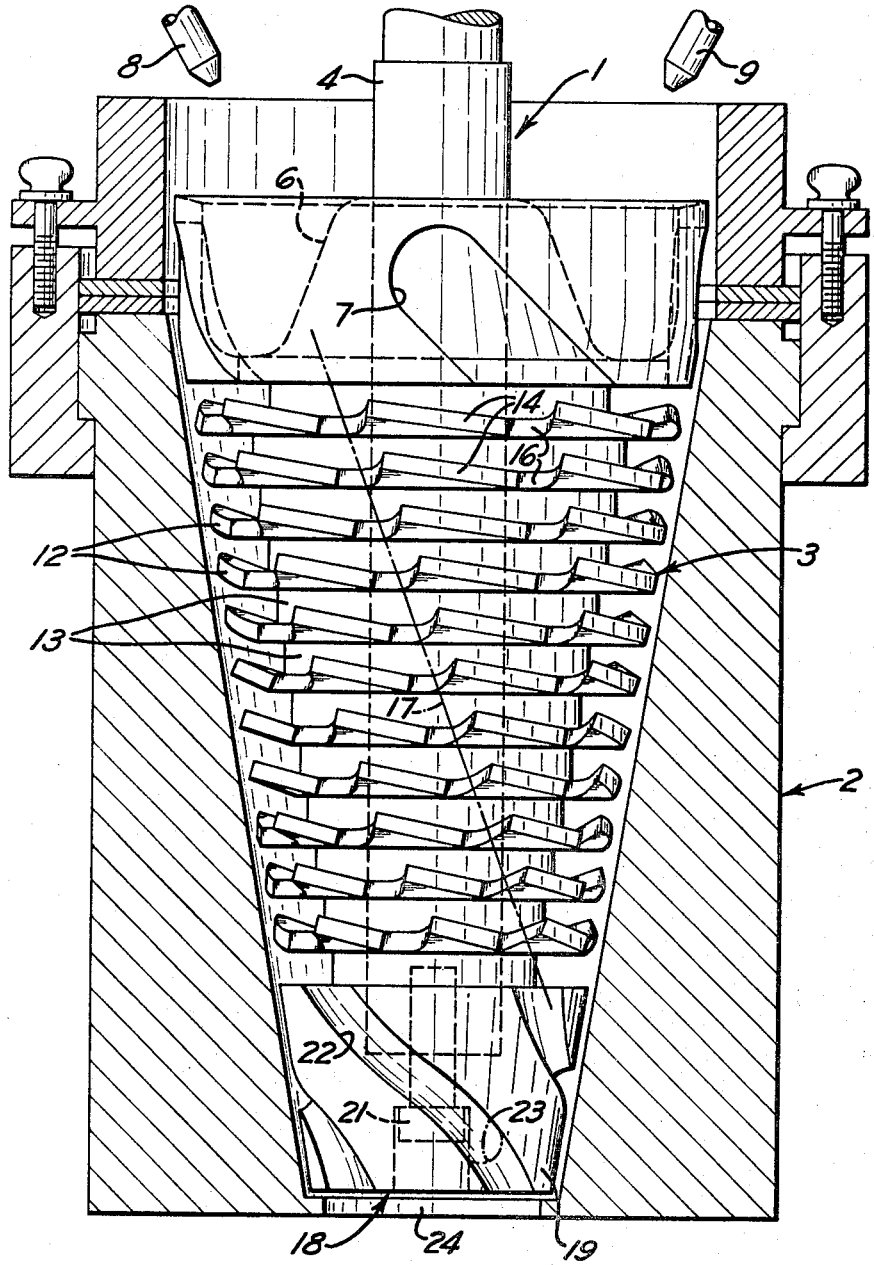
FIGURE 3 is a longitudinal view, partially in section, of another embodiment of the invention.

As illustrated in FIGURE 2, each of the discs has a plurality of tooth-like projections 14, and preferably eight of these projections are constructed on each disc, although this number may vary as desired. The slots 16 between the teeth of each disc may then be aligned with the slots between the teeth of the next adjacent disc to create the pitch 17 (shown in FIGURE 1) of the agitator which exercises a pumping action on the liquids. The angle at which the teeth of the discs are pitched is not critical, but is preferably in the range of from about 5° to about 30°. In another embodiment of this invention, the tooth-like projections of the discs may, instead of being on the same plane as the rest of the disc, be bent slightly as desired to complement the angle of pitch of the agitator as illustrated in FIGURE 3. The third part of the stirrer 18 is a means for securing the first two portions of the stirrer to the shaft 4, and is comprised of a base 19 having a bore through which a bolt or screw 21 is passed and threadably engaged to the shaft 4. The base portion of the stirrer has a plurality of substantially obliquely extending grooves 22 by which the liquids which have been introduced to the second portion of the stirrer and rapidly mixed, are pumped out of the mixer. There are preferably four such grooves in the base of the stirrer, each opening at the bottom of the base section as shown by the bold lines in the drawing. In a modification, the oblique grooves in the base portion of the stirrer may be ended before they reach the bottom of the base of the stirrer, as shown by the dotted line 23 in the figure. In that case, the exiting liquid is forced against the wall of the mixing chamber and a shearing action is achieved, either with the wall itself, or with the wall of the chamber in conjunction with an additional mechanical expediency which can be used to regulate the space between the exiting liquid at 23 and the surface nearest the effluence. Where the oblique grooves 22 are closed off as at 23 and a shearing action is obtained, a back pressure on the reactants being mixed is achieved by which the cell size of the foam product, if a foam is being fabricated, may be easily and efficiently regulated.

The liquid which has been mixed by the stirrer of this invention is then discharged through the orifice 24 of the mixing chamber. In the embodiment pictured, a small lip portion of the mixing chamber is allowed to extend part way into the orifice instead of having the wall of the chamber extend straight downward. By this device, the effluence is regulated so that a random spray of liquid is eliminated, and a substantially uniform flow of liquid is obtained. It is to be understood that this modification is only the preferred one and that any manner of discharge orifice desired may be used and is contemplated, including those which are fitted with a shroud or some similar device by which the spray of liquid from the discharge end of the chamber may be regulated.

As indicated hereinbefore, one of the most advantageous characteristics of the apparatus is that is easily modified and may be disassembled and reassembled as desired to fit any circumstance of equipment and reactants. In addition, the volume of the mixing chamber of this apparatus is relatively low allowing the stirrer 1 to be only about 1/16" or less smaller than the corresponding inner diameter of about 2", for example, of the mixing chamber. An apparatus having such a low volume permits intermittent operation without undesirable results and without the necessity of cleaning it between operations. The stirrer and mixing chamber may be made of any suitable metal or plastic such as, for example, steel, aluminum, nylon or the like.

Although the invention has been described in considerable detail in the foregoing for the purposes of illustration, it is to be understood that such detail is solely for this purpose and that variations can be made by those skilled in the art without departing from the spirit and scope of the invention except as is set forth in the claims.

What is claimed is:

1. A mixing apparatus which comprises a frusto-conically shaped chamber with an agitator of substantially the same shape disposed therewithin, said chamber having inlet means and a discharge opening and being only slightly larger than the agitator, whereby substantially instantaneous mixing may be accomplished with resultant increase in pump-out capability due to the relatively small capacity for the material to be mixed, said agitator having a shaft and a stirrer, said shaft extending longitudinally through the center of said stirrer, said stirrer having a receiving portion adjacent said inlet means, a body mixing portion, and securing means adjacent said discharge opening, said receiving portion being substantially bowl-shaped and having an axially aligned bore therethrough adapted to receive said shaft, said bowl-shaped receiving portion having a side wall and a base, said side wall having a plurality of slot-like openings therein whereby liquid components of said mixing apparatus may be channeled to said body mixing portion, said stirrer being comprised of a plurality of discs with spacers therebetween, said discs adapted to be movable and said discs and spacers having a bore through the center thereof to receive said shaft, each of said discs having a diameter greater than that of the spacers adjacent thereto and having a plurality of tooth-like projections, said securing means being attached to said shaft and having a plurality of obliquely extending grooves therein adapted to communicate with said discharge opening of said chamber.

2. The apparatus of claim 1 wherein the tooth-like projections are pitched.

3. The apparatus of claim 1 wherein the tooth-like projections are turned at an angle whereby rapid mixing of the liquid components and control of the back pressure on said components with accompanying regulation of pore size of a product formed from said liquid component is facilitated.

4. The apparatus of claim 3 wherein the angle is one which substantially complements an angle of pitch of the agitator.

5. A substantially frusto-conical agitator apparatus adapted to be placed within a similarly shaped chamber only slightly larger than said agitator apparatus, said agitator apparatus comprising a substantially bowl-shaped receiving portion with inlet means, said receiving portion having an axially aligned bore therethrough adapted to receive a shaft which extends longitudinally through the center of said agitator apparatus by way of a body mixing portion and a base portion, and said receiving portion having a plurality of slot-like openings in the outer walls thereof whereby liquid components to be mixed by said agitator apparatus may be channeled to the body mixing portion of said agitator apparatus, said body mixing portion being comprised of a plurality of movable and interchangeable discs with spacers therebetween of a greater thickness than the thickness of the discs adjacent thereto, said discs having a plurality of tooth-like projections with slots therein adapted to be aligned with the slots of the discs adjacent thereto to create a pumping action on said components, said base portion having a plurality of substantially obliquely extending grooves therein whereby said components may be pumped out of said apparatus through exit means.

References Cited

UNITED STATES PATENTS

| | | | |
|---|---|---|---|
| 2,071,393 | 2/1937 | Doherty | 259—7 XR |
| 2,304,579 | 12/1942 | Lindsey | 259—8 XR |
| 2,868,518 | 1/1959 | Corby et al. | 259—8 |
| 3,307,792 | 3/1967 | Hughes et al. | 259—8 XR |
| 3,212,128 | 10/1965 | Carlson et al. | 259—7 XR |

FOREIGN PATENTS

| | | |
|---|---|---|
| 892,724 | 3/1962 | Great Britain. |

WALTER A. SCHEEL, *Primary Examiner.*

JOHN M. BELL, *Assistant Examiner.*

U.S. Cl. X.R.

259—8, 134